United States Patent [19]
Ito et al.

[11] 3,888,835
[45] June 10, 1975

[54] METHOD FOR THE POLYMERIZATION OF COPOLYMERIZATION OF ETHYLENE

[75] Inventors: Akira Ito; Kazuhiro Matsuzaki; Yoshio Morimoto, all of Nagoya, Japan

[73] Assignee: Mitsui Toatsu Chemicals, Incorporated, Tokyo, Japan

[22] Filed: July 5, 1972

[21] Appl. No.: 269,156

[30] Foreign Application Priority Data
July 22, 1971  Japan.............................. 46-54824

[52] U.S. Cl..... 260/88.2 R; 252/429 B; 252/429 C; 260/94.9 C; 260/94.9 DA; 260/94.9 E
[51] Int. Cl............................. C08f 1/56; C08f 3/06
[58] Field of Search...... 260/88.2, 94.9 C, 94.9 DA, 260/94.9 E

[56] References Cited
UNITED STATES PATENTS
3,513,143   5/1970   Diedrich et al. ............... 260/99.9 E
3,676,415   7/1972   Diedrich et al. ............ 260/94.9 DA FOREIGN PATENTS OR APPLICATIONS
2,137,872   2/1972    Germany
2,029,992   12/1970   Germany
1,958,488   5/1970    Germany
1,958,046   6/1970    Germany
2,130,314   12/1971   Germany
1,001,820   8/1965    United Kingdom

*Primary Examiner*—Edward J. Smith
*Attorney, Agent, or Firm*—Fisher, Christen & Sabol

[57] ABSTRACT

Ethylene is polymerized or copolymerized with an α-olefine in the presence of a catalyst consisting of (A) a co-comminuted composition of (a) a titanium compound, (b) an aluminum halide-ether complex, and (c) a magnesium halide, and (B) an organo-aluminum compound.

9 Claims, No Drawings

METHOD FOR THE POLYMERIZATION OF COPOLYMERIZATION OF ETHYLENE

BACKGROUND OF THE INVENTION

1. Field of the Invention

This invention relates to a method for the polymerization or copolymerization, of ethylene in the presence of a composite catalyst made up of a titanium compound and an organo-metallic compound characterized in that the titanium compound component of said composite catalyst is subjected to a special activation treatment. All reference hereinafter to polymerization includes also copolymerization.

2. Description of Prior Art

In the polymerization of ethylene or other α-olefins, it is conventional practice to employ what is commonly known as a Ziegler-Natta catalyst.

Recently, supported catalysts have been developed. For example, a catalyst system containing as one of its components, the co-comminuted powder of magnesium chloride and either titanium trichloride or titanium tetrachloride as disclosed in the published German patent specification (Offenlegungs-schrift) Nos. 1,958,046 or 1,958,488 (hereinafter referred to as OLS 1,958,046 or OLS 1,958,488 is said to have an unusually high activity per unit weight of titanium metal. However, when this catalyst system is employed in suspension polymerization, the bulk specific gravity of the product polyethylene is as low as 0.25 to 0.30 g/ml although the catalyst provides a comparatively high activity per unit weight of titanium metal as shown in comparative examples 1 to 6 and 8 to 11 which appear hereafter. Furthermore, as the concentration of the polymer slurry reached 250 to 400 g/l, the solvent is adsorbed on the polymer so that the reaction mixture becomes muddy and the polymerization no longer proceeds. In addition, to make the slurry manageable in commercial runs, it is necessary to dilute it to a concentration of about 150 to 250 g/l Furthermore, it has been found that the low bulk specific gravity results in insufficient agitation so that, frequently, part of the polymer is melted in the course of polymerization.

On the other hand, since this catalyst system involves the use of a large amount of magnesium chloride as a support, the yield of the product polymer per unit weight of magnesium chloride is low. Since magnesium chloride is not decomposed by alcohol which is routinely used for the decomposition of Ziegler-Natta catalysts, the magnesium chloride will remain in the polymer unless the polymer is given an after-treatment, for example, washed with water. In addition, the use of magnesium chloride is undesirable, for it liberates hydrogen chloride when heated in the presence of moisture.

SUMMARY OF THE INVENTION

The object of this invention is to provide a novel catalyst system free from the foregoing disadvantages. This invention is characterized in that ethylene is polymerized in the presence of a catalyst consisting of (A) a co-comminuted composition of the following components (a), (b) and (c):

a. at least one component selected from the group consisting of the following titanium compounds.
   1. titanium tetrachloride
   2. titanium trichloride (as hereinafter defined)
b. an aluminum halide-ether complex
c. magnesium halide, and (B) an organo-aluminum compound.

The effects of this invention are as follows.

1. The polymerization activity of the present catalyst is so high that the yield of polyethylene reaches from the tens of thousands to more than two million grams per gram of elementary titanium. Since the yields per gram of component (A) and per gram of magnesium chloride are also high, the after-treatment may be either omitted or simplified.

2. The aluminum halide-ether complex used as the component (b) of this invention is essentially soluble in hydrocarbon solvents and is substantially removed from the product polymer by filtration.

3. The catalyst suffers only a minor reduction in polymerization activity.

4. The bulk specific gravity of product polyethylene is as high as 0.36 to 0.45 g/ml so that the polymerization reaction can be carried out until the concentration of the the slurry reaches 500 g/l or more. Furthermore, this slurry can be handled by commercial techniques well established in the field of polyolefins.

Though the exact mechanism is not yet known, the above advantages of the present invention are believed to be ascribable to the employment of component (b). The catalyst component (A) according to the present invention has a considerably smaller specific surface area, for example up to 1 $m^2/g$ as in Example 18, than those without component (b), for example 120 $m^2/g$ in Comparative Example 1. Owing to this fairly small specific surface area, the polymerization activity of the catalyst of this invention is not so high at the initial stage of polymerization as to evolve a large amount of heat of reaction which would presumably fuse or aggregate the polymer particles and result in a decrease in the bulk density of the product. In addition, as the component (b) is soluble in hydrocarbon solvents commonly employed in the polymerization process, it is gradually leached out into the solvent during the course of polymerization and exposes the hidden active sites of the catalyst to compensate for those deactivated or exhausted.

DESCRIPTION OF THE PREFERRED EMBODIMENTS

To prepare the catalyst component (A) according to this invention, (1) titanium tetrachloride or (2) titanium trichloride is are used as said titanium compound (a). The term titanium trichloride includes titanium trichloride itself and all kinds of titanium trichloride compositions predominantly made up of titanium trichloride, such as the eutectic crystals of titanium trichloride and metal halide which is obtained upon reduction of titanium tetrachloride with a metal and the titanium trichloride composition which is obtained upon reduction of titanium tetrachloride with a compound containing a Si—H linkage or an organo-aluminum compound.

The aluminum halide to be used as a component of the aluminum halide-ether complex (b) is exemplified by anhydrous aluminum chloride, anhydrous aluminum bromide, anhydrous aluminum iodide and anhydrous aluminum fluoride. Particularly preferred is anhydrous aluminum chloride.

The other component of the complex (b) is a saturated or unsaturated ether which is represented by the general formula: $R^1-O-R^2$ (wherein $R^1$ and $R^2$ each is a hydrocarbon residue or a halogen-substituted hydrocarbon residue) or cyclic ether. Examples of the ether include diethyl ether, di-n-propyl ether, di-n-butyl ether, dicyclohexyl ether, diphenyl ether, ditolyl ether, methylphenyl ether, diallyl ether, di-(4-chlorophenyl) ether, di-(2-chlorophenyl) ether, tetrahydrofuran, etc. Particularly preferred are diphenyl ether, diethyl ether and tetrahydrofuran.

The aluminum halide-ether complex can be synthesized by the conventional procedure, e.g. by mixing aluminum halide with an ether or heating such mixture.

The magnesium halide to be employed in the method of this invention should be substantially anhydrous magnesium halide, and magnesium chloride and magnesium bromide are particularly preferred.

By comminuting the above material together, an activated titanium component, i.e. catalyst component (A), is obtained.

With regard to the composition of said catalyst component (A), the following proportions by weight are generally desirable: (a) 1 to 35% of titanium tetrachloride or 1 to 80% of titanium trichloride; (b) 5 to 50% of aluminun halide-ether complex, and (c) 10 to 90% of magnesium halide. The proportion actually employed should be selected within the above ranges with reference to such factors as the combination of (a) and (b), the desired yield per gram of component (A) and the chemical composition of residual catalyst in the purified polymer which is anticipated from the contemplated after-treatment.

Thus, when the polymerization is carried out at a high pressure, it is preferable to employ a component (A) containing high proportions of titanium trichloride or tetrachloride and magnesium chloride, for the yield of polymer per gram of component (A) will be high and no demineralization treatment will be rerequired. When an alcohol is employed to deactivate the catalyst in the after-treatment, component (A) is desirably rich in titanium trichloride and aluminum halide-ether complex, for these components will be decomposed by the alcohol. Where the after-treatment involves washing with water, a magnesium halide-rich composition is desirable.

The equipment to be used in comminuting the components may be one of conventional design. Examples include a ball mill, vibrating mill, tower mill, jet pulverizers and the like.

The above comminuting operation is carried out either under vacuum or in an inert atmosphere, and it is essential to ensure that moisture and oxygen be substantially completely excluded. The timing and order of admixing the components to be co-comminuted are virtually optional.

The comminuting temperature is also largely optional but usually ranges from −30°C to 150°C. Generally, the time required to achieve the desired comminution ranges from about 1 to about 100 hours.

The organo-aluminum compound which is employed as catalyst component (B) according to this invention is any of the known organo-aluminum compounds which are routinely used in combination with titanium compounds to prepare catalysts for the polymerization of ethylene or α-olefins. Furthermore, it is possible to add a known third component to obtain a titanium trichloride-, orango-aluminum compound-third component catalyst system.

The preferred organo-aluminum compound is one having the general formula: $AlRnX_{3-n}$ (wherein R is a hydrocarbon residue, X is halogen, alkoxyl radical or hydrogen, and n is an integer of 1 to 3). For example, diethyl aluminum monochloride, triethyl aluminum, di-n-propyl aluminum monochloride, di-isopropyl aluminum monochloride, tri-n-propyl aluminum, diisobutyl aluminum monochloride, triisobutyl aluminum, diethyl aluminum monohydride, ethyl ethoxy aluminum monochloride, diethyl aluminum monoethoxide, ethyl aluminum sesquichloride, ethyl aluminum dichloride and mixtures thereof are typical organo-aluminum compounds.

The method of this invention is applied to the production of homopolymers of ethylene of high density above 0.965 g/ml(23°C) and also of copolymers of modified density.

The monomers copolymerizable with ethylene are compounds of the general formula: $RCH = CH_2$ (wherein R is a hydrocarbon residue of 1 to 10 carbon atoms), exemplary monomers including propylene, 1-butene, 1-pentene, 1-hexane, 4-methyl-1-pentene and other α-olefins as well as styrene.

The polymerization reaction according to this invention is carried out under conditions which are routinely employed in the art. The polymerization temperature may range from 20°C to 300°C and preferably from 50° to 200°C. While the pressure may be anywhere between atmospheric pressure and 200 atm., it is generally desirable to carry out the polymerization at atmospheric pressure to 150 atm.

Generally, the polymerization reaction is carried out in a solvent which may be selected from among aliphatic, alicyclic and aromatic hydrocarbons and mixtures of such hydrocarbons.

For example, propane, butane, pentane, hexane, heptane, benzene, toluene, etc. are generally preferred. The polymerization method according to this invention can also be applied to polymerization reactions under conditions substantially free from solvents, for example, the gas phase polymerization of ethylene.

In the method of this invention, when a mixture of ethylene and an α-olefin containing more than 2 mol % of α-olefin is polymerized in the presence of a low-boiling solvent, i.e., a solvent which boils at a temperature of not higher than 40°C, low-density polymers having a density of about 0.93 g/ml and a bulk specific gravity of not less than 0.35 are expediently obtained as shown in examples. This is because the use of an increased proportion of α-olefin does not appreciably lower the bulk specific gravity the product polymer pursuant to the process of this invention as in the known processes.

In the practice of this invention, though the molecular weight of the polymer varies with the mode of reaction, type of catalyst and other polymerization conditions, the molecular weight may be controlled by the addition of, for example, hydrogen, alkyl halide or dialkyl zinc.

In the course of polymerization, the concentration of hydrogen and/or polymerization temperature may also be altered to vary the molecular weight of the polymer

EXAMPLE 1

In a vibrating mill (capacity 600 ml) containing about 80 steel balls measuring 12 mm in diameter, 6.4 g of the eutectic crystals of titanium trichloride and aluminum chloride (hereafter called A A-type titanium trichloride; approx. composition $TiCl_3 \cdot \frac{1}{3} AlCl_3$ prepared by reducing titanium tetrachloride with aluminum in the presence of aluminum chloride, followed by grinding), 21.1 g of magnesium chloride and 2.5 g of aluminum chloride-diphenylether complex were comminuted together for 14 hours at room temperature and in a nitrogen atmosphere.

The resulting powder was separated from the steel balls in a nitrogen atmosphere to obtain component (A) (Ti 5.20%), the specific surface area of which was not more than 1 $m^2/g$. A portion component (A) in an amount of 0.15 g was fed into an autoclave of 2 liter capacity together with 0.25 ml of triethyl aluminum, as component (B), and 1 liter of heptane under the nitrogen atmosphere. The nitrogen atmosphere in the autoclave was replaced with hydrogen gas, which was introduced to a pressure of 3.5 $kg/cm^2$ gauge, followed by the introduction of ethylene until the pressure of the gas phase was 6.5 $kg/cm^2$ gauge.

The charge in the autoclave was heated to an internal temperature of 90°C in 7 minutes and, at this temperature, the polymerization reaction was allowed to proceed.

During the polymerization, ethylene was continuously introduced to maintain the internal pressure at 9.5 $kg/cm^2$ gauge.

After 2.60 hours, the polymerized ethylene amounted to about 500 g. At this moment, the introduction of ethylene was suspended and the unreacted gases were let off. Then, 10 ml of methanol was added to the autoclave and the mixture was stirred for 30 minutes to decompose the catalyst. The rate of absorption of ethylene (velocity of polymerization), when the introduction of ethylene had been just suspended, was 2 g/min.

After the autoclave was cooled, the contents were withdrawn, filtered and dried at 60°C and under reduced pressure, whereupon 512 g of white polyethylene was obtained. This polyethylene had an intrinsic viscosity (tetralin, 135°C) of 1.10 and a bulk specific gravity of 0.38 g/ml.

The polymerization activity of the catalyst in this polymerization reaction was 1.313 kg/g-(A).hr. (The weight in kgs. of polymerized ethylene per gram of component A per hour; the same applies hereafter) or 25.3 kg/gT.hrTihr., and the yield of the polymer was 3.41 kg/g.-(A) or 55.8 kg/g.-Ti.

EXAMPLES 2–6

In the process of Example 1, the catalyst component (A) was prepared using varying amounts of titanium trichloride, magnesium chloride and $AlCl_3$-$OPh_2$ (aluminum chloride-diphenyl ether complex). Then, using $AlEt_3$ (triethyl aluminum) and $Al$-iso-$Bu_3$ (triisobutyl aluminum) as organo-aluminum compounds, the polymerization reaction was carried out in the same manner sa Example 1. The results were indicated in Table 1.

EXAMPLES 7–10

By the procedure described in Example 1, catalysts were prepared from titanium tetrachloride, magnesium chloride and aluminum chloride-diphenyl ether complex and, using those catalyst, ethylene was polymerized in the same manner as Example 1. The results are set forth in Table 1. The specific surface area of the activated titanium used in Example 7–10 was 1.9 $m^216$, 1.2$m^2/g$, up to 1 $m^2/g$, and up to 1 $m^2/g$, respectively.

EXAMPLES 11–13

Using the component (A) synthesized according to Example 8, the process of Example 1 was repeated except that different amounts of hydrogen were used.. The results are indicated in Table 1. The capacity of the autoclave used was 5 liters and heptane was employed in the amount of 2 liters. The product polymer obtained in Example 13 had an ash content of 160 ppm (4 ppm $TiO_2$, 114 ppm $Al_2O_3$ and 31 ppm MgO), and the press-sheet obtained therefrom was colorless and suitable for commercial use.

EXAMPLES 14 and 15

In the same manner as Example 1, component (A) was prepared from titanium tetrachloride, magnesium chloride and aluminum chloride-ethyl ether complex or aluminum chloride tetrahydrofuran complex and ethylene was polymerized. The results are indicated in Table 1.

COMPARATIVE EXAMPLES 1–6

A titanium trichloride composition was prepared by comminuting A A-type titanium trichloride and anhydrous magnesium chloride in the manner described in OLS 1,958,046. Using the above composition in place of catalyst component (A), the polymerization reaction was carried out under otherwise identical conditions as those used in Example 1. The results are indicated in Table 2. The bulk specific gravity of the product polyethylene was 0.25 – 0.28 g/ml. Because of the low bulk specific gravity, the rate of polymerization dropped drastically as the amount of polymerization reached 300 to 440 g/l, so that the polymerization reaction could not be continued. Furthermore, the reaction mixture was too viscose, to be easily transferred and, in order to handle the reaction mixture in the routine manner, it was necessary to dilute it to a polymer concentration of about 150 to 300 g/l.

In contrast, the method of this invention shown in Examples 1–15 gives rise to polymers having a high bulk specific gravity and even when the concentration of the product polymer is over 500 g/l, the reaction product can be handled by the routine slurry-handling technique. In addition, the catalyst of the present invention suffers only a minor reduction in polymerization activity.

Even though, in each of comparative examples, the yield of polyethylene per unit weight of titanium was comparatively high, the yield of polyethylene per magnesium chloride was somewhere between 0.80 and 8.7 kg/g MgCl$_2$. In the method of this invention, the latter yield is as high as 3.5 to 12.2 kg/g MgCl$_2$. When heated in the presence of moisture, magnesium chloride is decomposed to liberate hydrogen chloride. In addition, it cannot be easily decomposed with alcohols. Therefore, a higher yield of polyethylene per unit of magnesium chloride is of more advantage.

The specific surface area of the catalyst component (A) used in each of these Comparative Examples was 120 m$^2$/g., 98 m$^2$/g., 21 m$^2$/g, 19 m$^2$/g., 18 m$^2$/g, 17 m$^2$/g, respectively.

COMPARATIVE EXAMPLE 7

Ethylene was polymerized in the same manner as in Example 1 except that 0.3g of A A-type titanium trichloride was used in place of the component (A).

After a polymerization time of 2.36 hours, 486 g of polyethylene was obtained. This polyethylene had an intrinsic viscosity of 1.62 and a bulk specific gravity of 0.36 g/ml.

In this polymerization reaction, the polymerization activity of the catalyst was 0.61 kg/g-A A-type titanium trichloride·hr. or 2.52 kg/g-ti·hr. and the yield of polyethylene was 1.58 kg/g-A A-type titanium trichloride or 6.55 kg/g-Ti.

When the above result is compared with the results of Examples 1 to 15, it is apparent that the yields of polyethylene relative to titanium which are attainable by the method of this invention are from 4 to 30 times the yield attained in the Comparative Examples.

Furthermore, in these Comparative Examples the polymer was deposited in a form of film on the internal wall of the autoclave so that continuous polymerization was difficult. Moreover, the product polyethylene was light yellow in color even after washing with water. In the method of this invention, polymer does not deposit on the internal wall of the autoclave and the polymer obtained from the reaction product by treating it with an alcohol to deactivate the catalyst and filtering or by filtering it without any pretreatment is white even after being allowed to stand in the air.

COMPARATIVE EXAMPLES 8–10

A comminuted mixture of anhydrous magnesium chloride and titanium tetrachloride, which was disclosed in OLS 1,958,488, was used as catalyst component (A). Otherwise, the procedure described in Example 1 is followed to obtain the results set forth in Table 3.

The bulk specific gravity of the product polyethylene was 0.27 to 0.30 g/ml and, because of the low bulk specific gravity, the rate of polymerization dropped drastically as the amount of polymerization per batch reached 350 g or more so that the polymerization reaction could not be continued any longer. Furthermore, the reaction product was too viscous to be easily transported or otherwise handled. To handle it in the routine manner, it was necessary to dilute the reaction product with about 0.5 l of additional heptane until the concentration of the polymer became about 250 to 300 g/l. Therefore, it entails a great deal of difficulty to use the catalyst system on a commercial scale and the high polymerization activity of the catalyst cannot be effectively exploited.

In contract, as shown in Examples 1 to 15, the method of this invention provides polymers having high bulk density. It is possible to handle the above polymers in the same manner as a usual slurry even if the polymer concentration is no lower than 500 g/l with substantially no decrease of polymerization activity thereof.

The specific surface areas of the catalyst component (A) used in the above comparative examples were as follows:

| Comparative Example | 8 | 54 m$^2$/g |
|---|---|---|
| do. | 9 | 38 m$^2$/g |
| do. | 10 | 16 m$^2$/g. |

EXAMPLE 16

Example 1 was followed excepting that 0.040 g of a catalyst component (A) (Ti content 2.03%) prepared from 2.4 g of titanium tetrachloride, 23.2 g of magnesium chloride and 4.4 g of aluminum chloride-diphenyl complex is employed and the partial pressure of hydrogen was 3.3 kg/cm$^2$.

After 3.1 hours of polymerization, when the rate of absorption of ethylene was 2.0 g/min., 543 g of white polyethylene was obtained. The product had an intrinsic viscosity of 1.72, bulk density of 0.40 g/ml, and an ash content of 128 ppm (2.3 ppm TiO$_2$, 105 ppm Al$_2$O$_3$ and 20 ppm MgO). The polymerization activity was 4.38 kg/g-(A)·hr or 215.8 kg/g-Ti·hr and the yield of the polymer was 13.58 kg/g-(A) or 669 kg/g-Ti.

EXAMPLE 17–20

Ethylene was polymerized using a component (A) synthesized from titanium tetrachloride, magnesium chloride and aluminum chloride-ether complexes. The results are shown in Table 4.

EXAMPLE 21

Using the catalyst component (A) used in Example 8, a gaseous mixture of ethylene and propylene containing 1.2 mole % of propylene was polymerized in the same manner as Example 1.

With use of 0.040 g of the above catalyst component (A), the polymerization reaction was carried out at a temperature of 85°C for 2.92 hours. The partial pressure of hydrogen and that of ethylene were 2.6 kg/cm$^2$ and 5.8 kg/cm$^2$, respectively. The procedure yielded 523 g of a polymer having an intrinsic viscosity of 1.80 and a bulk specific gravity of 0.36 g/ml. As measured by IR absorption spectrometry, the mumber of methyl groups per 1000 carbon atoms was 1.8.

The polymerization activity of the catalyst in the above polymerization reaction was 4.48 kg/g-(A)·hr. or 220.5 kg/g-Ti·hr. The yield of the polymer was 13.1 kg/g-(A), 644.0 kg/g-Ti or 16.1 kg/g-MgCl$_2$.

EXAMPLE 22

In a SUS-27 autoclave of 5 l. capacity, ethylene was polymerized at 85°C using 0.063 g of the component (A) synthesized in Example 8, 0.4 ml of triethyl aluminum and 1.3 kg of butane. The pressure of the gaseous phase was 45 kg/cm$^2$ gauge and the partial pressure of hydrogen was 17.5 kg/cm$^2$.

After a polymerization time of 3 hours, the reaction product was filtered to obtain 1021 g of polyethylene (intrinsic viscosity 1.05; bulk specific gravity 0.45 g/ml).

The polymerization activity of the catalyst in this polymerization reaction was 5.40 kg/g-(A)·hr or 267.0 kg/g-Ti·hr. The yield of polyethylene was 16.20 kg/g-(A), 801.0 kg/g-Ti or 19.90 kg/g-MgCl$_2$.

The ash content of the polyethylene was 110 ppm (2 ppm TiO$_2$, 90 ppm Al$_2$O$_3$ and 15 ppm MgO).

EXAMPLE 23

Example 22 was repeated excepting that 0.025 g of the catalyst component (A) was employed and the partial pressure of hydrogen is 6 kg/cm$^2$.

After a polymerization time of 2.6 hours, the reaction mixture was filtered to obtain 1081 g of white polyethylene having an intrinsic viscosity of 1.88, bulk density of 0.40 g/ml and an ash content of 88 ppm (0.7 ppm TiO$_2$, 78 ppm Al$_2$O$_3$ and 7 ppm MgO).

The polymerization activity was 16.6 kg/g-(A)·hr or 817 kg/g-Ti·hr. The yield of polyethylene was 43.2 hg/g-(A), 2124 kg/g-Ti or 55.9 kg/g-MgCl$_2$.

EXAMPLE 24

Using catalyst component (A) (Ti: 0.99 wt %) obtained by comminuting 1.2 g of titanium tetrachloride, 24.4 g of magnesium chloride and 4.4 g of AlCl$_3$ - OPh$_2$ complex, ethylene and 1-butene were co-polymerized in butane as solvent.

An autoclave similar to that used in Example 22 was charged with 0.055 g of the above component (A), 1 ml. of triethyl aluminum and 30 ml. of n-heptane, followed by the introduction of 1.5 kg of butane and 150 ml. of 1-butene. The temperature was raised to 80°C and hydrogen and ethylene were fed to a partial pressure of 4 kg/cm$^2$ and 9 kg/cm$^2$, respectively. The polymerization reaction was conducted at a constant temperature of 80°C. Ethylene was fed to the autoclave to establish a polymerization pressure of 24 kg/cm$^2$ gauge. After 2 hours of polymerization, 922 g of polymer was obtained. This polymer had an intrinsic viscosity of 1.05, a bulk specific gravity of 0.38 g/ml and a density of 0.935 g/ml. The number of methyl groups per 1000 carbon atoms was 8.3. The polymerization activity of the catalyst was 8.4 kg/g-(A)·hr or 846 kg/g-Ti·hr., and the yield of polyethylene was 16.8 kg/g-(A) or 1690 kg/g-Ti.

EXAMPLE 25

By a procedure similar to that described in Example 18, ethylene gas containing 4 mol % of propylene was polymerized using 0.050 g of catalyst component (A). After 2 hours of polymerization, 1018 g of polymer having a bulk density of 0.37 g/ml was obtained.

This polymer had an intrinsic viscosity of 1.17 and a density of 0.938 g/ml. The number of methyl groups per 1000 carbon atoms was 10.3.

The activity of the catalyst in the above reaction was 10.2 kg/g-(A)·hr or 1010 kg/g-Ti·hr, and the yield of polyethylene was 20.4 kg/g-(A) or 2020 kg/g-Ti.

TABLE 1

| Ex. No. | Catalyst Component (A) Composition (percent) AA-type TiCl$_3$ (percent) | TiCl$_4$ (percent) | MgCl$_2$ (percent) | Ether complex Type | Ether complex Amount used (percent) | Ti content (percent) | Amount used (g.) | Component (B) Type | Component (B) Amount used (g.) | H$_2$ (kg/cm$^2$) | Time of polymerization (hr.) | Yield of polyethylene (g.) | Rate of absorption at the end of polymerization (g./min.) | Activity Kg/g.(A)·hr | Activity Kg/g.Ti·hr | Yield of polyethylene Kg/g.(A) | Kg/g.Ti | Kg/g.MgCl$_2$ | Intrinsic viscosity | Bulk specific gravity (g./ml.) |
|---|---|---|---|---|---|---|---|---|---|---|---|---|---|---|---|---|---|---|---|---|
| 2 | 10.0 | — | 79.8 | AlCl$_3$·OPh$_2$ complex | 10.2 | 2.4 | 0.176 | AlEt$_3$ | 0.25 | 4.5 | 2.67 | 523 | 2.0 | 1.12 | 46.5 | 2.98 | 124 | 3.74 | 1.09 | 0.41 |
| 3 | 21.4 | — | 70.2 | do | 8.4 | 4.5 | 0.130 | Al-isoBu$_3$ | 0.5 | 4.5 | 2.50 | 508 | 1.5 | 1.56 | 30.0 | 3.90 | 75 | 5.56 | 1.04 | 0.38 |
| 4 | 40.8 | — | 40.0 | do | 10.2 | 12.0 | 0.114 | Al-isoBu$_3$ | 0.5 | 4.5 | 3.0 | 513 | 1.5 | 1.50 | 12.5 | 4.50 | 38 | 11.25 | 1.12 | 0.42 |
| 5 | 49.2 | — | 39.8 | do | 10.0 | 9.4 | 0.150 | Al-isoBu$_3$ | 0.5 | 4.5 | 2.83 | 495 | 2.0 | 1.16 | 12.3 | 3.28 | 35 | 8.25 | 1.03 | 0.40 |
| 6 | 30.3 | — | 29.6 | do | 40.1 | 7.6 | 0.145 | Al-isoBu$_3$ | 1.0 | 4.5 | 3.0 | 521 | 1.5 | 1.20 | 15.8 | 3.60 | 47 | 12.16 | 1.01 | 0.36 |
| 7 | — | 3.9 | 86.2 | do | 9.9 | 0.98 | 0.160 | Al-isoBu$_3$ | 0.5 | 4.5 | 3.05 | 518 | 1.5 | 1.06 | 108.0 | 3.23 | 392 | 3.63 | 1.18 | 0.41 |
| 8 | — | 8.1 | 81.3 | do | 10.6 | 2.03 | 0.120 | AlEt$_3$ | 0.25 | 4.5 | 3.33 | 520 | 1.5 | 1.30 | 64.0 | 4.33 | 213 | 5.33 | 1.10 | 0.39 |
| 9 | — | 16.0 | 75.4 | do | 9. | 3.78 | 0.083 | Al-isoBu$_3$ | 1.0 | 4.5 | 3.17 | 488 | 1.5 | 1.86 | 49.0 | 4.88 | 156 | 7.80 | 1.07 | 0.41 |
| 10 | — | 5.7 | 79.8 | do | 15.0 | 1.44 | 0.130 | Al-isoBu$_3$ | 1.0 | 4.5 | 2.58 | 518 | 2.0 | 1.53 | 106.0 | 3.94 | 274 | 4.93 | 1.12 | 0.39 |
| 11 | — | 8.1 | 81.3 | do | 10.6 | 2.03 | 0.208 | AlEt$_3$ | 0.5 | 4.5 | 3.20 | 1058 | 3.5 | 1.59 | 78.3 | 5.08 | 251 | 6.25 | 1.08 | 0.39 |
| 12 | — | 8.1 | 81.3 | do | 10.6 | 2.03 | 0.137 | AlEt$_3$ | 0.5 | 4.5 | 3.08 | 993 | 3.5 | 2.35 | 115.9 | 7.25 | 357 | 8.91 | 1.38 | 0.31 |
| 13 | — | 8.1 | 81.3 | do | 10.6 | 2.03 | 0.092 | AlEt$_3$ | 0.5 | 2.5 | 3.30 | 1108 | 3.0 | 3.65 | 179.7 | 12.0 | 593 | 14.81 | 1.68 | 0.37 |
| 14 | — | 9.8 | 79.8 | AlCl$_3$ diethyl ether complex | 10.4 | 2.5 | 0.145 | AlEt$_3$ | 0.25 | 4.5 | 3.0 | 495 | 1.5 | 1.38 | 55.0 | 4.13 | 165 | 5.17 | 1.00 | 0.42 |
| 15 | — | 9.9 | 79.3 | AlCl$_3$ tetrahydrofuran complex | 10.8 | 2.5 | 0.120 | AlEt$_3$ | 0.25 | 4.5 | 3.0 | 525 | 1.5 | 1.46 | 58.0 | 4.37 | 174 | 5.52 | 1.11 | 0.39 |

TABLE 2

| Example No. | Catalyst component (A) Composition | | | | Conditions of polymerization | | | Results of polymerization | | | | | |
|---|---|---|---|---|---|---|---|---|---|---|---|---|---|
| | AA type TiCl₃ (wt. percent) | MgCl₂ (wt. percent) | Ti content (wt. percent) | Amount of activated titanium trichloride (g.) | Time of polymerization (hr.) | Yield of polyethylene (g.) | Rate of absorption at the end of polymerization (g./min.) | Activity Kg./g., (A)·hr. | Kg./g., Ti·hr. | Yield of polyethylene Kg./g., (A) | Kg./g., Ti | Kg./g., MgCl₂ | Intrinsic viscosity | Bulk specific gravity (g./ml.) |

Comparative No.:
| | | | | | | | | | | | | | | |
|---|---|---|---|---|---|---|---|---|---|---|---|---|---|---|
| 1 | 4.2 | 95.8 | 1.03 | 0.287 | 3.0 | 278 | Less than 0.5. | 0.32 | 30.8 | 0.83 | 92.3 | 0.87 | 1.20 | 0.30 |
| 2 | 8.4 | 91.6 | 2.25 | 0.499 | 1.83 | 345 | Substantially no absorption. | 0.38 | 16.8 | 0.70 | 30.7 | 0.76 | 1.29 | 0.27 |
| 3 | 20.3 | 79.7 | 4.93 | 0.089 | 2.17 | 374 | do | 0.91 | 18.5 | 1.98 | 41.0 | 2.48 | 1.13 | 0.27 |
| 4 | 26.1 | 73.9 | 6.54 | 0.088 | 2.33 | 343 | do | 1.67 | 25.5 | 3.89 | 59.4 | 5.26 | 1.23 | 0.25 |
| 5 | 29.8 | 70.2 | 7.54 | 0.099 | 2.5 | 420 | do | 1.70 | 22.7 | 4.24 | 56.8 | 6.04 | 1.13 | 0.29 |
| 6 | 43.4 | 56.6 | 10.71 | 0.065 | 3.0 | 320 | 0.5 | 1.65 | 15.4 | 4.94 | 46.2 | 8.72 | 1.32 | 0.28 |

TABLE 3

| Example No. | Catalyst | | | | | | | Conditions | | | Results of polymerization | | | | | | |
|---|---|---|---|---|---|---|---|---|---|---|---|---|---|---|---|---|---|
| | (A) Titanium component Composition (percent) | | Ti content (percent) | Amount used (g.) | (B) Organoaluminum compound Type | Amount used (ml.) | | Time of polymerization (hr.) | Yield of polyethylene (g.) | Rate of absorption at the end of polymerization (g./min.) | Activity Kg./g., (A)·hr. | Kg./g., Ti·hr. | Yield of polyethylene Kg./g., (A) | Kg./g., Ti | Kg./g., MgCl₂ | Intrinsic viscosity | Bulk specific gravity (g./ml.) |
| | TiCl₄ | MgCl₂ | | | | | | | | | | | | | | | |

Comparative No.:
| | | | | | | | | | | | | | | | | | |
|---|---|---|---|---|---|---|---|---|---|---|---|---|---|---|---|---|---|
| 8 | 5.3 | 94.7 | 1.52 | 0.403 | AlEt₃ | 0.25 | | 2.17 | 398 | 0 | 0.45 | 29.9 | 0.99 | 64.9 | 1.04 | 1.10 | 0.23 |
| 9 | 10.7 | 89.3 | 2.50 | 0.246 | AlEt₃ | 0.25 | | 2.50 | 388 | 0 | 0.56 | 22.5 | 1.58 | 63.0 | 1.76 | 1.18 | 0.27 |
| 10 | 18.9 | 81.1 | 4.97 | 0.206 | AlEt₃ | 0.25 | | 2.50 | 423 | 0 | 1.09 | 22.0 | 2.73 | 55.0 | 3.37 | 1.11 | 0.30 |

TABLE 4

| Ex. No. | Catalyst* | | | | | | | | Conditions | | | Results of polymerization | | | | | | |
|---|---|---|---|---|---|---|---|---|---|---|---|---|---|---|---|---|---|---|
| | Component (A) Composition (percent) | | | Ether complex | | Ti content (percent) | Amount used (g.) | Component (B) Type | Amount used (g.) | H₂ (kg./cm.²) | Time of polymerization (hr.) | Yield of polyethylene (g.) | Rate of absorption at the end of polymerization (g./min.) | Activity Kg./g., (A)·hr. | Kg./g., Ti·hr. | Yield of polyethylene Kg./g., (A) | Kg./g., Ti | Kg./g., MgCl₂ | Intrinsic viscosity | Bulk specific gravity (g./ml.) |
| | AA-type TiCl₃ (percent) | TiCl₄ (percent) | MgCl₂ (percent) | Type | Amount used (percent) | | | | | | | | | | | | | |
| 17 | 3.9 | | 76.2 | AlCl₃·OPh₂ complex | 19.9 | 0.98 | 0.060 | AlEt₃ | 0.25 | 2.5 | 3.38 | 511 | 1.5 | 2.52 | 257 | 8.5 | 869 | 11.8 | 1.92 | 0.41 |
| 18 | 5.7 | | 79.8 | do | 15.0 | 1.44 | 0.046 | AlEt₃ | 0.25 | 2.5 | 3.05 | 531 | 2.0 | 3.78 | 263 | 11.5 | 802 | 14.4 | 1.82 | 0.40 |
| 19 | 9.8 | | 74.8 | AlCl₃ diethyl ether complex | 15.4 | 2.5 | 0.038 | AlEt₃ | 0.25 | 2.5 | 2.9 | 537 | 2.0 | 4.87 | 195 | 14.1 | 566 | 18.9 | 1.68 | 0.40 |
| 20 | 9.9 | | 74.3 | AlCl₃ tetrahydrofuran complex. | 15.8 | 2.5 | 0.040 | AlEt₃ | 0.25 | 2.5 | 2.7 | 528 | 2.0 | 4.89 | 196 | 13.2 | 529 | 17.8 | 1.72 | 0.41 |

*The specific surface area of the catalyst component (A) used in each of above examples are up to 1 m.²/g.

What is claimed is:

1. A method of polymerizing ethylene which comprises polymerizing or copolymerizing ethylene in a suspension polymerization system in the presence of a catalyst consisting of
   A. a co-comminuted composition of the following components:
      a. at least one component selected from the group consisting of titanium tetrachloride and titanium trichloride, said titanium tetrachloride comprising 1–35% by weight and said titanium trichloride comprising 1–80% by weight of component (A),
      b. an aluminum halide-ether complex wherein the ether component thereof is a saturated or unsaturated ether of the formula $R^1-O-R^2$ wherein $R^1$ and $R^2$ each is a hydrocarbon residue or a halogen-substituted hydrocarbon residue or together form a cyclic ether, said aluminum halide-ether complex comprising 5–50% by weight of component (A) and
      c. magnesium halide; and
   B. an organo-aluminum compound.

2. A method according to claim 1 wherein the component (a) is titanium tetrachloride.

3. A method according to claim 1 wherein the component (a) is titanium trichloride.

4. A method according to claim 1 wherein the organo-aluminum compound is a trialkyl aluminum.

5. A method according to claim 1 wherein the polymerization is effected in the presence of an inert hydrocarbon medium of carbon number of 3–7.

6. A method according to claim 1 wherein the component (b) is aluminum chloride-diphenylether complex.

7. A method according to claim 1 wherein the component (b) is aluminum chloride-diethylether complex 8. A method according to claim 1 wherein the component (b) is aluminum chloride-tetrahydrofuran complex.

9. A method for production of a crystalline polymer having a density of 0.92–0.95 g/ml. and a bulk specific gravity not less than 0.35 which comprises polymerizing a mixture of ethylene and an α-olefin containing more than 2 mol % of α-olefin in an inert hydrocarbon having a boiling point below 40°C. in the presence of a catalyst consisting of
   A. a co-comminuted composition of the following components:
      a. at least one component selected from the group consisting of titanium tetrachloride and titanium trichloride, said titanium tetrachloride comprising 1–35% by weight and said titanium trichloride comprising 1–80% by weight of component (A),
      b. an aluminum halide-ether complex wherein the ether component thereof is a saturated or unsaturated ether of the formula $R^1-O-R^2$ wherein $R^1$ and $R^2$ each is a hydrocarbon residue or a halogen-substituted hydrocarbon residue or together form a cyclic ether, said aluminum halide-ether complex comprising 5–50% by weight of Component (A), and
      c. magnesium halide; and
   B. an organo-aluminum compound.

* * * * *